(12) United States Patent
Masuda et al.

(10) Patent No.: US 10,967,808 B2
(45) Date of Patent: Apr. 6, 2021

(54) INTERIOR COVER MOUNT ASSEMBLY

(71) Applicants: TOYOTA BOSHOKU KABUSHIKI KAISHA, Aichi (JP); TOYOTA JIDOSHA KABUSHIKI KAISHA, Aichi-ken (JP)

(72) Inventors: Tomonari Masuda, Aichi-ken (JP); Mitsuaki Eshima, Aichi-ken (JP)

(73) Assignees: TOYOTA BOSHOKU KABUSHIKI KAISHA, Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 103 days.

(21) Appl. No.: 16/393,451

(22) Filed: Apr. 24, 2019

(65) Prior Publication Data
US 2019/0344643 A1    Nov. 14, 2019

(30) Foreign Application Priority Data

May 11, 2018    (JP) .............................. JP2018-091946

(51) Int. Cl.
*B60R 13/02*    (2006.01)
*B60J 5/04*    (2006.01)

(52) U.S. Cl.
CPC ......... *B60R 13/0206* (2013.01); *B60J 5/0413* (2013.01); *B60J 5/0416* (2013.01);
(Continued)

(58) Field of Classification Search
CPC ...... B60J 5/0413; B60J 5/0469; B60J 5/0434; B60R 13/0206; B60R 2021/23382; B60R 13/0243
(Continued)

(56) References Cited

U.S. PATENT DOCUMENTS 8,303,010 B2    11/2012    She
8,876,151 B2    11/2014    Yamamoto
(Continued)

FOREIGN PATENT DOCUMENTS

DE    11 2014 005 312    8/2016
EP         2 614 995    7/2013
(Continued)

OTHER PUBLICATIONS

Extended European Search Report issued in European Pat. App. No. 19170470.9, dated Jun. 26, 2019.
(Continued)

*Primary Examiner* — Jason S Morrow
(74) *Attorney, Agent, or Firm* — Greenblum & Bernstein, P.L.C.

(57) ABSTRACT

An interior cover mount assembly includes a base member and an interior cover including a clip and the clip includes an arm section and a head section having a width greater than that of the arm section. The base member has an insertion stopper hole through which the head section is inserted and a projection projecting from the base member toward the interior cover and disposed near the holding section. The insertion stopper hole includes an insertion section through which the head section is inserted and a holding section having a width smaller than that of the head section and greater than that of the arm section and where the arm section is arranged. In the interior cover that is mounted on the base member, the clip is fit in the insertion stopper hole such that the head section overlaps the holding section and the projection in the mounting direction.

11 Claims, 8 Drawing Sheets

(52) U.S. Cl.
CPC ........... *B60J 5/0434* (2013.01); *B60J 5/0469* (2013.01); *B60R 13/0243* (2013.01)

(58) Field of Classification Search
USPC .................................. 296/1.08, 1.09, 146.7
See application file for complete search history.

(56) References Cited

U.S. PATENT DOCUMENTS

| | | | | |
|---|---|---|---|---|
| 9,751,489 | B2* | 9/2017 | Yamamoto | B60R 21/213 |
| 9,821,747 | B2* | 11/2017 | Benedetti | F16B 21/075 |
| 9,889,778 | B2 | 2/2018 | Mizuno et al. | |
| 10,137,845 | B2* | 11/2018 | Yamamoto | B60R 13/025 |
| 2006/0239772 | A1* | 10/2006 | Kuroda | F16B 5/0657 |
| | | | | 403/329 |
| 2007/0075531 | A1* | 4/2007 | Tsuge | B60R 13/02 |
| | | | | 280/730.2 |
| 2009/0183436 | A1 | 7/2009 | Dry | |
| 2010/0199464 | A1* | 8/2010 | Sano | F16B 21/10 |
| | | | | 24/289 |
| 2012/0119532 | A1 | 5/2012 | She | |
| 2013/0168515 | A1 | 7/2013 | Yamamoto | |
| 2015/0035310 | A1* | 2/2015 | Yamaguchi | B60R 13/0206 |
| | | | | 296/153 |
| 2015/0191131 | A1* | 7/2015 | Yamamoto | B60R 13/0206 |
| | | | | 24/289 |
| 2015/0211555 | A1* | 7/2015 | Yamamoto | F16B 2/20 |
| | | | | 24/289 |
| 2016/0121810 | A1* | 5/2016 | Stanczak | B60R 13/0206 |
| | | | | 296/1.08 |
| 2016/0167614 | A1* | 6/2016 | Inami | B60R 21/215 |
| | | | | 280/730.2 |
| 2016/0288674 | A1 | 10/2016 | Mizuno et al. | |
| 2016/0368447 | A1* | 12/2016 | Sakurai | B60R 13/0206 |
| 2019/0211853 | A1* | 7/2019 | Vicino | F16B 5/0664 |
| 2019/0322237 | A1* | 10/2019 | Bacelos | B60R 13/025 |
| 2019/0344729 | A1* | 11/2019 | Masuda | B60R 13/0243 |
| 2020/0114838 | A1* | 4/2020 | Naoi | B60R 21/2155 |

FOREIGN PATENT DOCUMENTS

| | | |
|---|---|---|
| JP | 2003-312351 | 11/2003 |
| JP | 2006-188082 | 7/2006 |
| JP | 2013-237420 | 11/2013 |
| WO | 2009/016733 | 2/2009 |

OTHER PUBLICATIONS

Official Communication in Japanese Patent Application No. 2018-091946 dated Feb. 27, 2020, along with English-language translation thereof.

\* cited by examiner

INTERIOR COVER MOUNT ASSEMBLY

CROSS REFERENCE TO RELATED APPLICATION

This application claims priority from Japanese Patent Application No. 2018-91946 filed on May 11, 2018. The entire contents of the priority application are incorporated herein by reference.

TECHNICAL FIELD

The present disclosure described herein relates to an interior cover mount assembly.

BACKGROUND

An interior cover may be attached to a vehicle interior component such as a door trim as a separate component from the vehicle interior component to improve design of the vehicular interior component. The interior cover may be fit on the vehicle interior component from a vehicular interior side. One example of such an interior cover may be a grip cover of a door grip and such a grip cover is attached to a grip base member. The interior cover may be detached from the grip base member due to a holding force of a passenger or shock caused by a collision.

SUMMARY

A tether clip may be used such that the interior cover is less likely to be detached from the base member. The tether clip may be mounted on a back surface of the interior cover and an arm section (a tether section) of the tether clip extending toward the base member is fixed to a part of the base member at a distal end portion of the arm section. In a configuration including such a clip, the distal end portion of the tether clip is necessarily held on the base member before mounting the interior cover on the base member. This lowers work efficiency of mounting the interior cover on the base member.

An object of the present technology described herein is to provide an interior cover mount assembly wherein an interior cover is mounted easily and less likely to be detached from a base member.

An interior cover mount assembly according to a technology described herein includes a base member and an interior cover that is attached to the base member from a vehicular interior side in a mounting direction and the interior cover includes a clip with which the interior cover is fixed to the base member. The clip includes an arm section extending from the interior cover toward the base member and a head section that is included continuously from a distal end portion of the arm section and has a width greater than that of the arm section. The base member has an insertion stopper hole through which the head section is inserted and a projection projecting from a vehicular interior side surface of the base member toward the interior cover. The insertion stopper hole includes an insertion section through which the head section is inserted and a holding section extending from the insertion section and having a width smaller than that of the head section and greater than that of the arm section and in which the arm section is arranged. The projection is disposed near the holding section. In the interior cover that is mounted on the base member, the clip is fit in the insertion stopper hole such that the head section overlaps the holding section and the projection in the mounting direction. The clip is elastically deformed toward the insertion section by contact with the projection according to movement of the interior cover toward the base member in the mounting direction in a mounting operation of the interior cover to the base member, and according to further movement of the interior cover toward the base member in the mounting direction, the head section is inserted through the insertion section and the clip elastically restores its original shape and the arm section is fit in the holding section such that the clip is held in the insertion stopper hole.

According to the technology described herein, an interior cover mount assembly with an easy mounting operation and less occurrence of detachment from the base member can be provided.

DETAILED DESCRIPTION

An embodiment of the present technology will be described with reference to the drawings. The resent technology described herein is not limited to the following embodiments but may be altered or improved based on knowledges of those having skills in the art.

Figure 1:
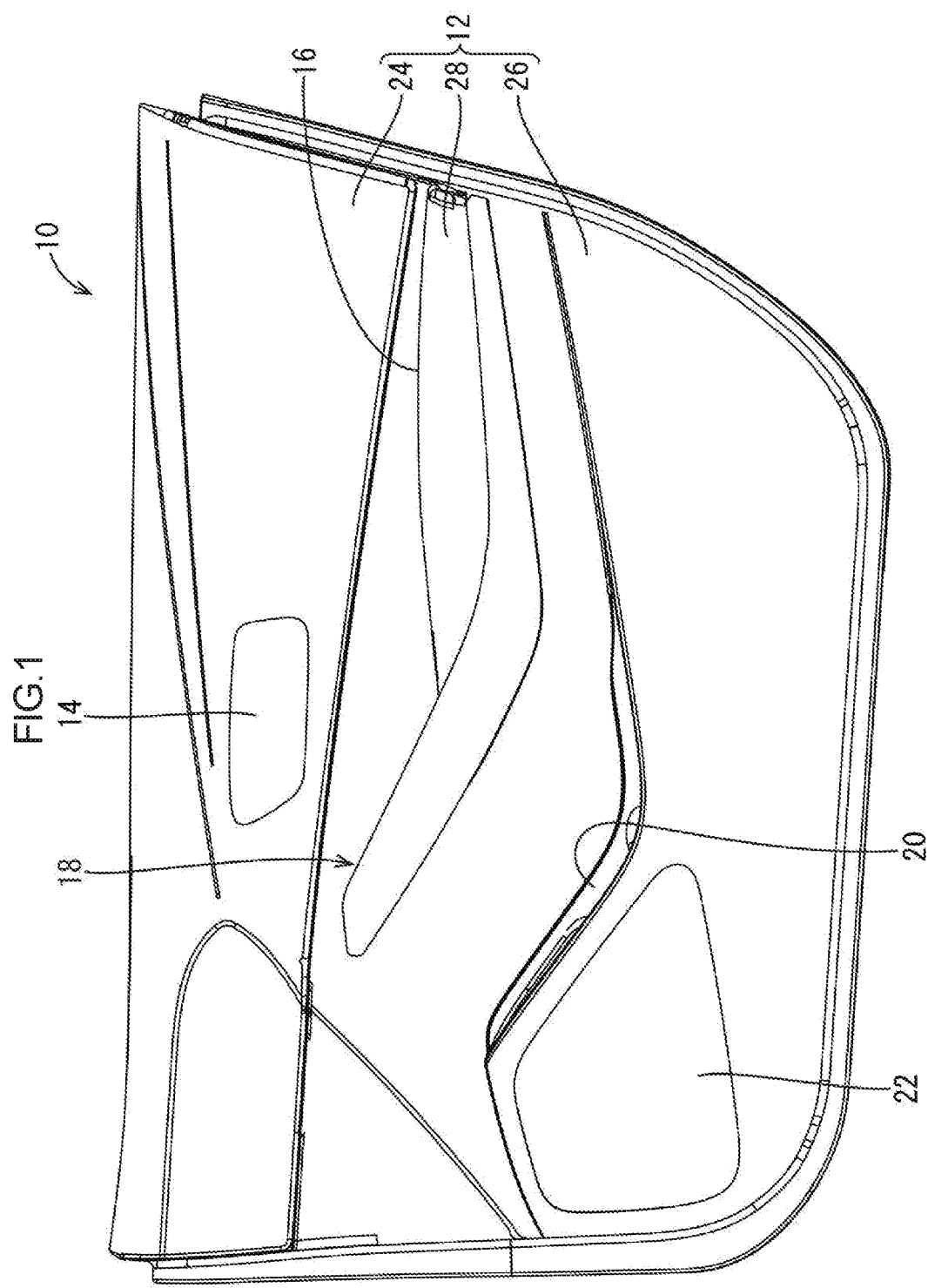
FIG. 1 is an elevation view illustrating a door trim including an interior cover mount assembly according to one embodiment of the present technology.

A door trim 10 including an interior cover mount assembly 100 according to the present embodiment is illustrated in FIG. 1. The door trim 10 will be described first. The door trim 10 is a vehicular interior side section of a vehicle side door and mounted on a door inner panel from a vehicular interior side. The door trim 10 mainly includes a trim board 12 and various kinds of functional components such as an inside handle 14, an armrest 16, a door grip 18, a door pocket 20 and a speaker grill 22. The trim board 12 includes multiple board members that are joined each other and includes an upper board 24, a lower board 26, and an armrest board 28. The inside handle 14 is mounted in the upper board 24. The armrest 16 includes the armrest board 28 that is fixed in an upper section of the lower board 26 or in a substantially middle section of the trim board 12. The door grip 18 is mounted on a section of the lower board 26 that is on a vehicular front side of the armrest 16. The door pocket 20 and the speaker grill 22 are mounted on a lower section of the lower board 26.

Figure 2:
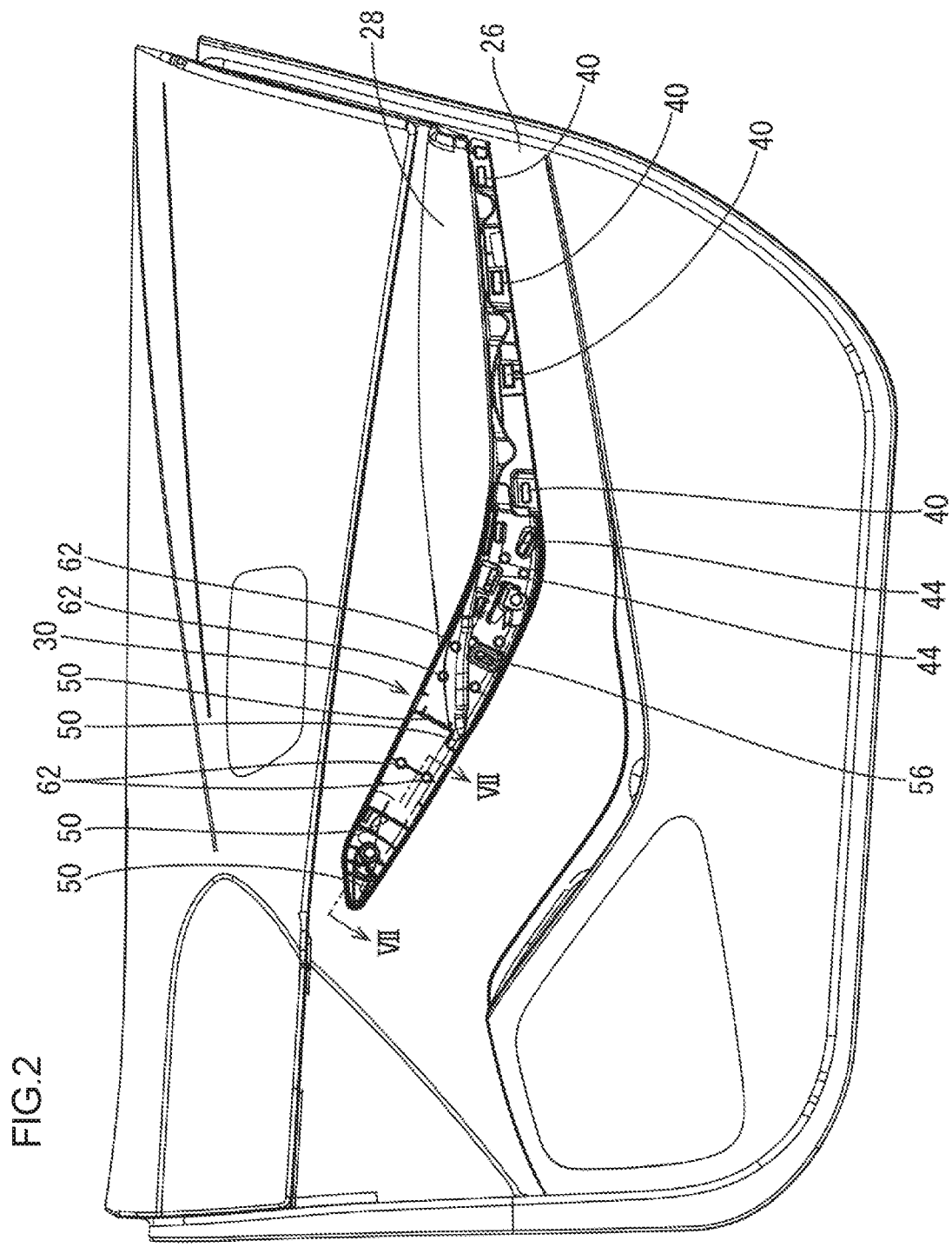
FIG. 2 is an elevation view illustrating the door trim of FIG. 1 from which a grip cover is detached.
Figure 3:
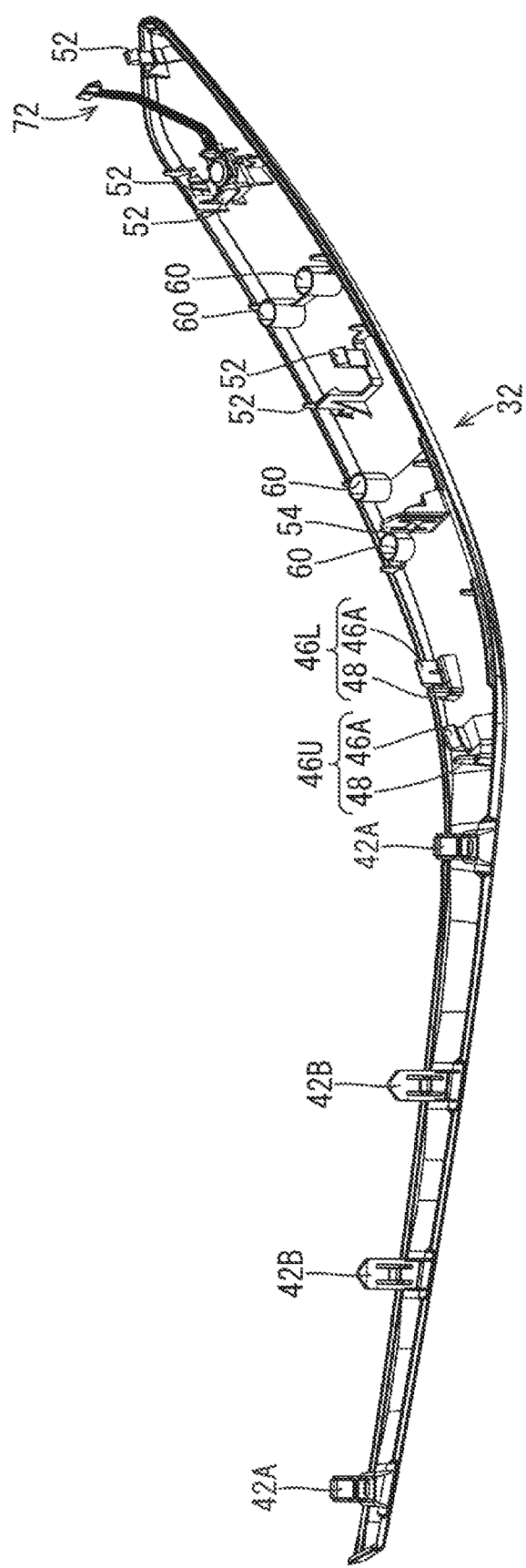
FIG. 3 is a perspective view illustrating a grip cover of the door grip in FIG. 1.
Figure 4:
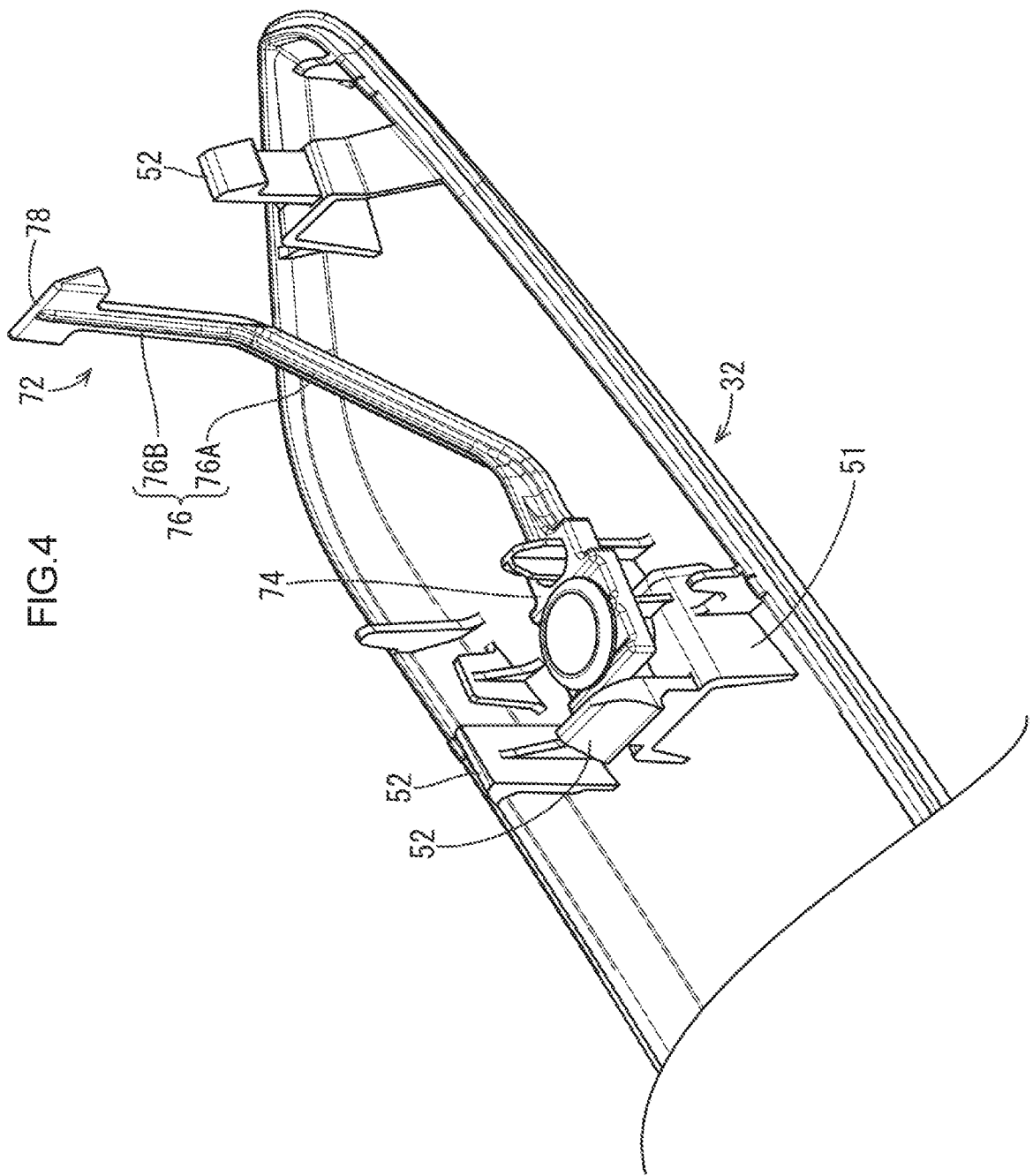
FIG. 4 is an enlarged perspective view illustrating a part of the grip cover in FIG. 3.

The door grip 18 has an elongated shape and is inclined downward as it extends toward the vehicular rear side. The door trip 18 is spaced from a vehicular interior side surface of the lower board 26 and has a space therebetween at a middle section of the elongated shape. A passenger puts his/her hand in the space to hold the door grip 18 when the passenger opens or closes a door or keeps his/her posture. As illustrated in FIGS. 2 and 3, the door grip 18 includes a grip base member 30 and a grip cover 32. The grip base member 30 is fixed to the lower board 26 and the grip base member 30 is covered with the grip cover 32 from the vehicular interior side. The grip base member 30 is a long plate member that is elongated in a vehicular front-rear direction and is fixed to the lower board 26 with fixing members at two ends of the elongated plate member including a vehicular front end portion and a vehicular rear end portion. The grip base member 30 has a width in a width direction that is perpendicular to the elongated direction thereof. After the grip base member 30 is attached to the lower board 26, a space is created between the vehicular exterior side surface of the grip base member 30 and the vehicular interior side surface of the lower board 26. The grip base member 30 is disposed such that a vehicular rear side end portion thereof is near a vehicular front side end portion of the armrest 16. Details of an interior cover mount assembly 100 including the grip cover 32 and the grip base member 30 will be described below.

As illustrated in FIG. 2, the grip base member 30 that is fixed to the lower board 26 is open toward the vehicular interior side. The opening of the grip base member 30 extends from the vehicular front side end portion to the vehicular rear side end portion of the grip base member 30 and further extends toward the vehicular rear side along a lower edge of the armrest board 28. As illustrated in FIG. 3, the grip cover 32 is a long plate member extending in the vehicular front-rear direction and includes a vehicular front side end portion that covers the grip base member 30 and a vehicular rear side end portion that covers the opening of the lower board 26 below the armrest board 28.

Next, an operation of mounting the grip cover 32 in the grip base member 30 that is attached to the lower board 26 will be described. The grip cover 32, the grip base member 30, and the lower board 26 include mounting members for attaching the grip cover 32 to the grip base member 30 and the lower board 26. The mounting members include a first mounting member, a second mounting member, a third mounting member, and a fourth mounting member.

The first mounting member includes a first stopper hole 40 in the lower board 26 and first stoppers 42A, 42B of the grip cover 32. The first stoppers 42A and 42B project from a vehicular exterior side surface of the grip cover 32. The vehicular rear side portion of the grip cover 32 is attached to the lower board 26 with the first mounting member (the first stopper holes 40 and the first stoppers 42A, 42B). As illustrated in FIG. 2, four first stopper holes 40 are formed in the lower board 26. Each of the first stopper holes 40 is a rectangular hole and open toward the vehicular interior side. The grip cover 32 includes the first stoppers 42A, 42B corresponding to the first stopper holes 40 so as to be fit in the respective first stopper holes 40.

As illustrated in FIG. 3, among the four first stoppers 42A, 42B, the two first stoppers 42A are disposed on the vehicular front side and the vehicular rear side, respectively. Each of the first stoppers 42A includes a plate member and projections on both surfaces of the plate member, which are an upper surface and a lower surface of the plate member. The first stopper 42A is stopped at opposed hole edges of the first stopper hole 40 having a rectangular shape, which are an upper hole edge and a lower hole edge. The two first stoppers 42B are disposed between the two first stoppers 42A. Each of the first stoppers 42B includes a plate member and a projection on one surface of the plate member, which is a lower surface of the plate member. The first stopper 42B is stopped at one hole edge of the first stopper hole 40, which is a lower hole edge.

The second mounting member includes second stopper holes 44 in the grip base member 30 and second stoppers 46U, 46L of the grip cover 32. As illustrated in FIG. 3, the second stoppers 46U, 46L project from a vehicular exterior side surface of the grip cover 32. The middle section of the grip cover 32 is attached to the vehicular rear side portion (the lower portion) of the grip base member 30 with the second mounting member. As illustrated in FIG. 2, the grip base member 30 includes two second stopper holes 44 that are open toward the vehicular interior side. The grip cover 32 includes the second stoppers 46U, 46L corresponding to the two second stopper holes 44. Each of the second stoppers 46U, 46L includes a second stopper portion 46A that is inserted in the second stopper hole 44 and a positioning projection 48 next to the second stopper portion 46A.

Each of the two second stopper holes 44 has a rectangular hole extending along an elongated dimension of the door grip 18. The second stopper portion 46A and the positioning projection 48 can be inserted within the second stopper hole 44. The second stopper portion 46A includes a plate member and a projection on a distal end of the plate member and is stopped at a hole edge of the second stopper hole 44 with the projection. As illustrated in FIG. 3, the second stopper 46U is disposed near an upper edge of the grip cover 32 and is stopped by an upper hole edge of the second stopper hole 44. The second stopper 46L is disposed near a lower edge of the grip cover 32 and is stopped by a lower hole edge of the second stopper hole 44. A position of each of the second stoppers 46U, 46L in the second stopper hole 44 with respect to the longitudinal dimension is defined by the positioning projection 48. Namely, the two second stoppers 46U, 46L, which are the second mounting member, define the position and direction of the grip cover 32 with respect to the grip base member 30.

Figure 7:
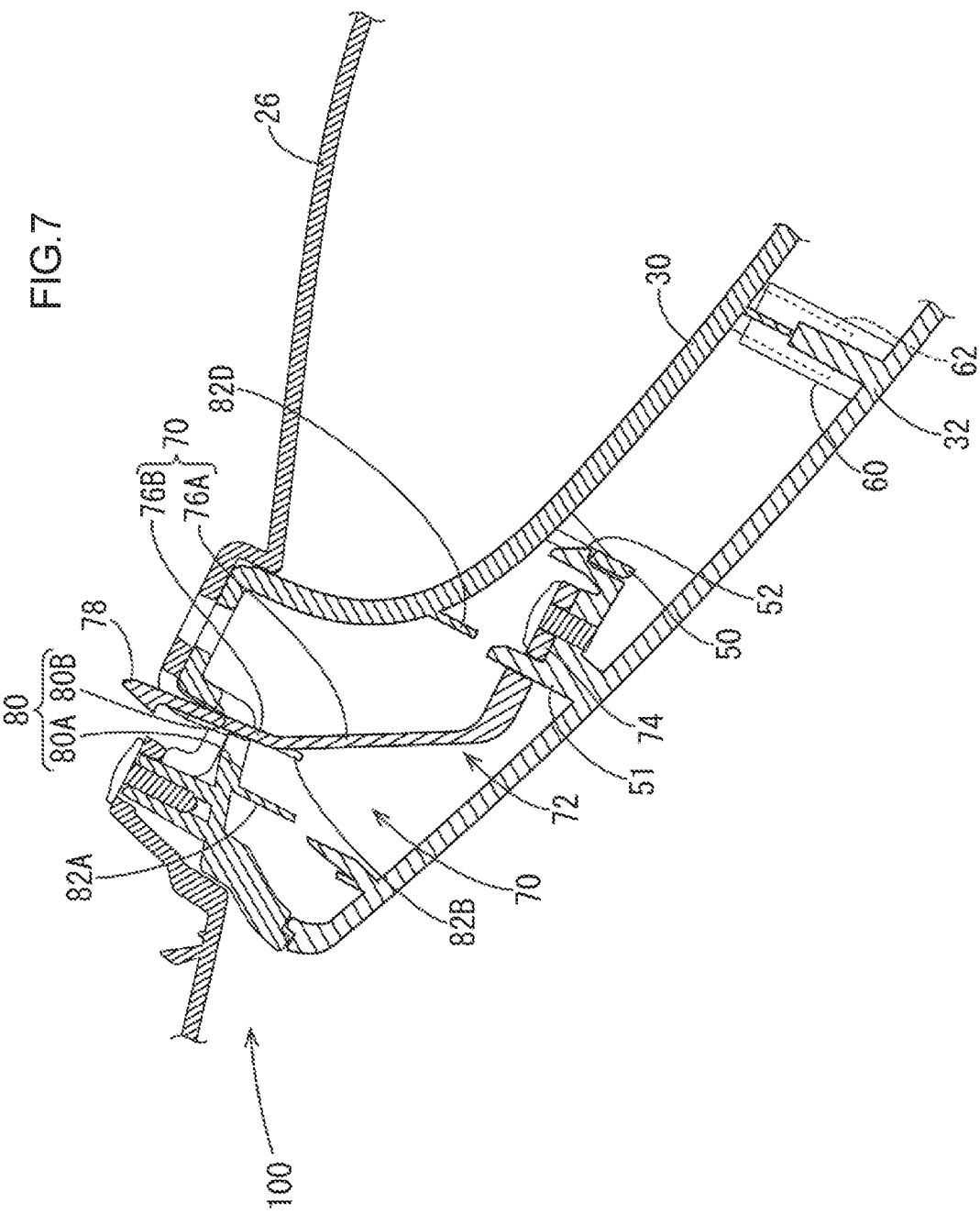
FIG. 7 is a cross-sectional view illustrating the grip cover that is mounted on the grip base member and taken along line VII-VII line in FIG. 2.
Figure 8:
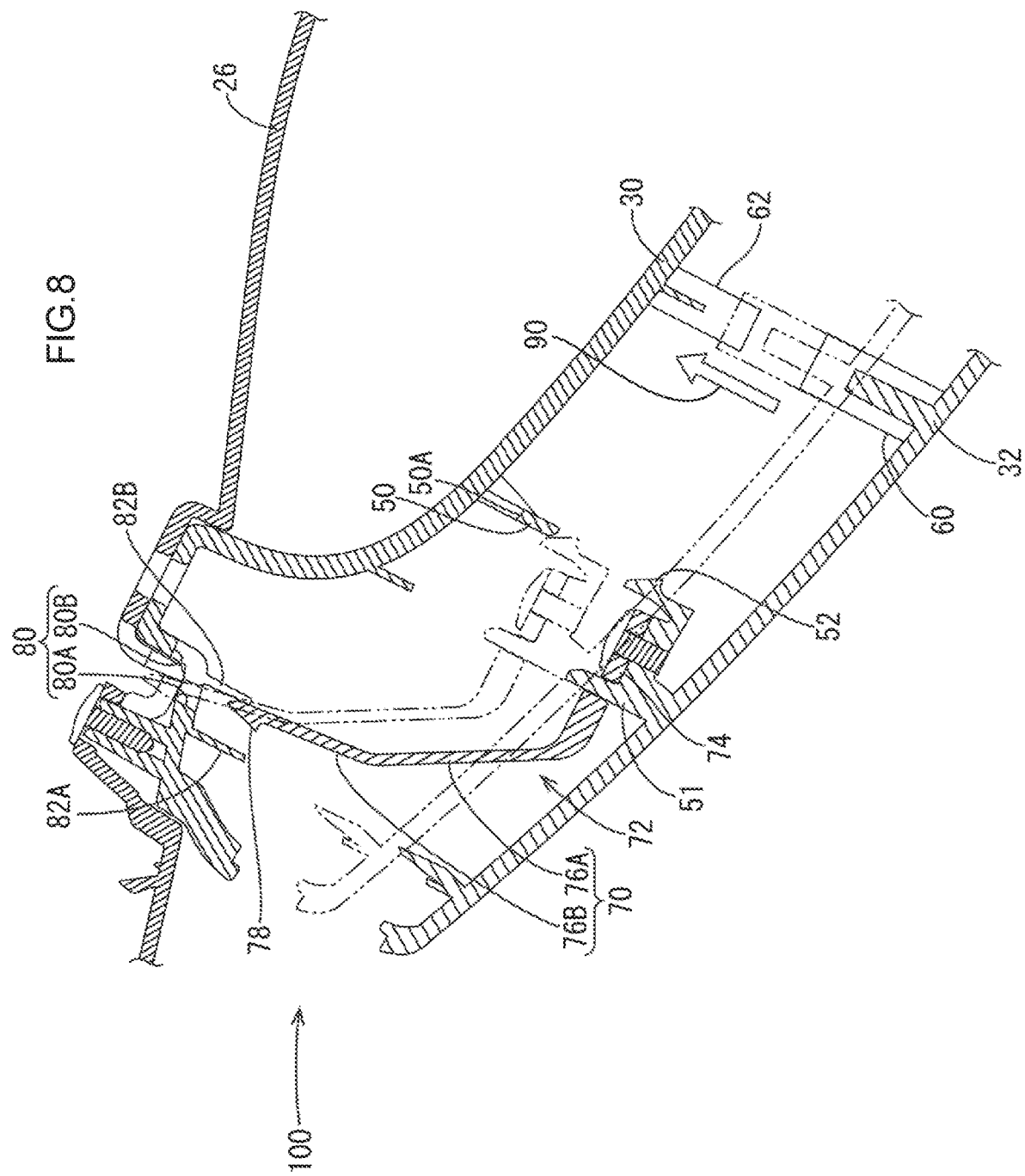
FIG. 8 is a cross-sectional view illustrating the grip cover that is to be mounted in the grip base.

The third mounting member includes walls 50 that extend from the vehicular interior side surface of the grip base member 30 and have holes 50A and third stoppers 52 that project from the vehicular exterior side surface of the grip cover 32. The vehicular front side portion of the grip cover 32 (the portion on the vehicular front side of the second mounting member) is attached to the grip base member 30 with the third mounting member. As illustrated in FIGS. 7 and 8, the wall 50 extends from the vehicular interior side surface of the grip base member 30 and has the hole 50A at a distal portion thereof. The grip cover 32 includes the third stoppers 52 corresponding to the respective walls 50 and each of the third stoppers 52 has a projection at a distal end thereof. When the grip cover 32 is attached to the grip base member 30, the projection of each third stopper 52 is fit in the hole 50A of the corresponding wall 50 such that the third stopper 52 is stopped by the wall 50. One of the third mounting member has a configuration similar to that of the first mounting member. The stopper 54 of the clip cover 32 having the projection is stopped in a stopper hole 56 in the grip base member 30. One of the third stoppers 52 is continuous to a clip fixing section 51 that extends from the vehicular exterior side surface of the grip cover 32 as illustrated in FIGS. 7 and 8.

The grip cover 32 is attached to the grip base member 30 and the lower board 26 with the first mounting member, the second mounting member, and the third mounting member. In mounting the grip cover 32 on the grip base member 30, the mounting direction 90 is defined. Specifically, the grip cover 32 and the grip base member 30 include a guide member therebetween at the vehicular front side portions thereof. The insertion movement of the grip cover 32 into the grip base member 30 is guided by the guide member. In detail, as illustrated in FIGS. 3, 7 and 8, the grip cover 32 includes first guide members 60 having a tubular shape. The grip base member 30 includes second guide members 62 corresponding to the first guide members 60. The second guide member 62 has an outline having a diameter smaller than an inner diameter of the first guide member 60. The second guide member 62 is formed in a tubular shape.

The position of the grip cover 32 with respect to the grip base member 30 is defined by the second mounting member (the second stopper holes 44 and the second stoppers 46U, 46L). As illustrated in FIGS. 7 and 8, in mounting the grip cover 32 on the grip base member 30, the second guide members 62 of the grip base member 30 are fit in the first guide members 60 of the grip cover 32. Namely, the first guide members 60 of the grip cover 32 are recesses and the second guide members 62 of the grip base member 30 are projections so as to be fit to each other. Accordingly, the mounting direction 90 of the grip cover 32 into the grip base member 30 is defined by the guide member.

In case of a side collision in the vehicle including the door trim 10 of this embodiment, a locking state may be released in some of the mounting members due to deformation of the door or shock. The grip cover 32 is an elongated member and therefore, the end portion thereof, especially the vehicular front side portion that is mounted in a middle section of the door trim 10 is easy to be detached. If the grip cover 32 is mounted on the grip base member 30 only with the first mounting member, the second mounting member, and the third mounting member, the vehicular front side portion of the grip cover 32 may be detached from the grip base member 30 in case of a side collision and may hit a passenger.

The interior cover mount assembly 100 according to the present embodiment includes a fourth mounting member 70 for connecting the grip cover 32 and the grip base member 30 as illustrating FIGS. 3, 4, 7 and 8. The fourth mounting member 70 includes a tether clip 72. Even if the connection state of the third mounting member (the walls 50 including the holes 50A and the third stoppers 52) is released, the tether clip 72 prevents the grip cover 32 from being detached from the grip base member 30. Hereinafter, the fourth mounting member 70 will be described in detail with reference to FIGS. 4 to 8.

As illustrated in FIG. 3, the tether clip 72 is fixed to a vehicular exterior side surface of a vehicular front side end portion of the grip cover 32. The tether clip 72 includes a fixing section 74, a tether section (an arm section) 76, and an anchor section (a head section) 78. The fixing section 74 is fixed to the grip cover 32. Specifically, the fixing section 74 is fixed to the clip fixing section 51 of the grip cover 32 with a fixing member such as a screw.

The tether section 76 extends from the fixing section 74 toward the grip base member 30. The anchor section 78 is provided at a distal end of the tether section 76. As illustrated in FIG. 8, the tether section 76 includes a first extending portion 76A and a second extending portion 76B. The first extending portion 76A extends from the fixing section 74 toward the front end of the grip cover 32 along the vehicular exterior side surface of the grip cover 32 and is angled and extends toward the grip base member 30 (the vehicular exterior side). The second extending portion 76B is angled and extends from the first extending portion 76A toward the grip base member 30. The second extending portion 76B extends substantially parallel to the mounting direction 90.

The anchor section 78 has a width greater than that of the tether section 76. The width is a dimension perpendicular to the extending direction of the tether section 76 in a plan view. Namely, the distal end portion of the tether clip 72 has a substantially T-shape. The anchor section 78 is thicker than the tether section 76. The anchor section 78 is a tapered shape such that a thickness thereof is decreased toward the distal end. Accordingly, the anchor section 78 easily enters an insertion stopper hole 80, which will be described later.

Figure 5:
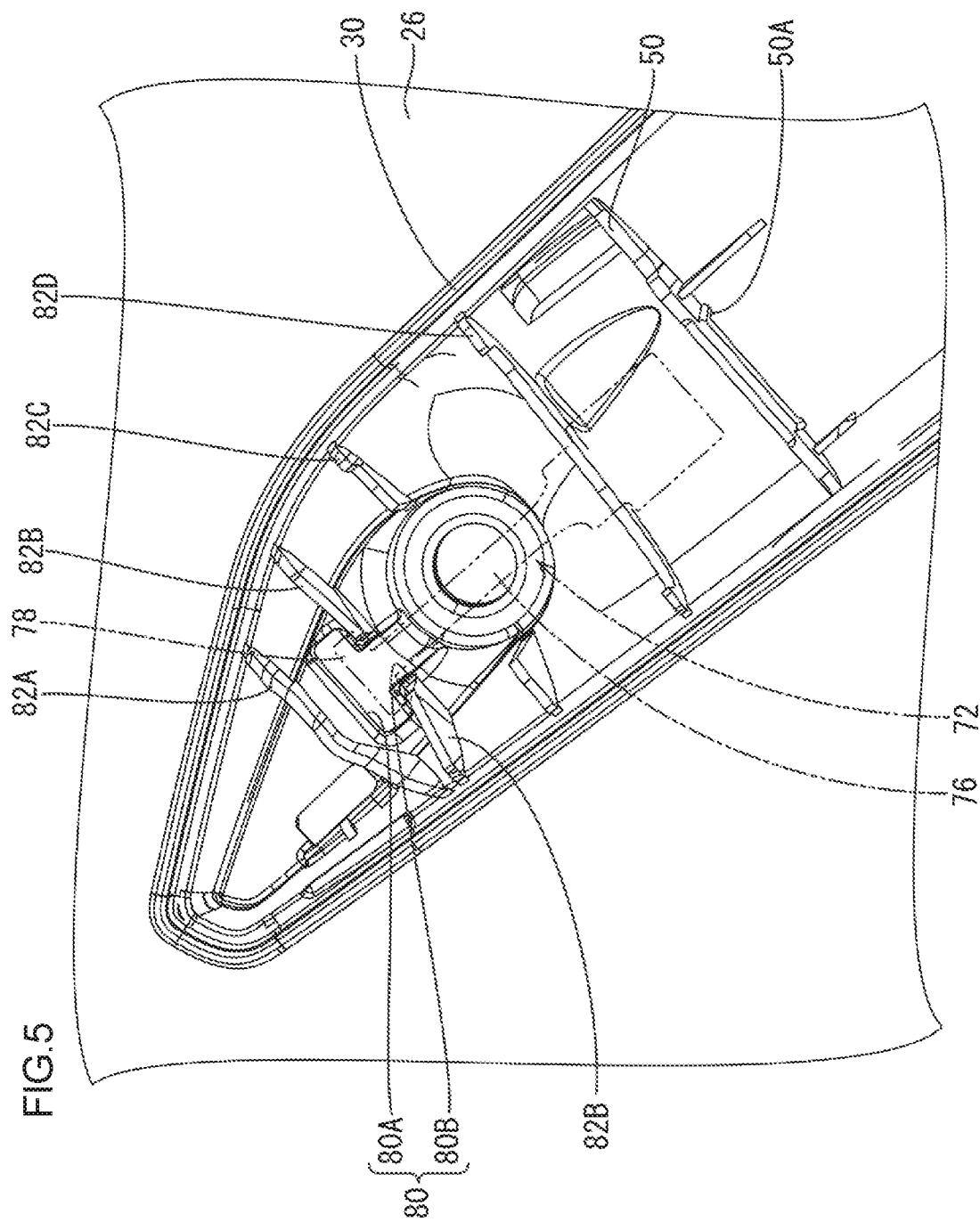
FIG. 5 is an enlarged elevation view illustrating a part of a grip base member in FIG. 1.

As illustrated in FIG. 5, the fourth mounting member 70 further includes an insertion stopper hole 80 having a T-shape. The tether clip 72 is inserted through the insertion stopper hole 80. The insertion stopper hole 80 includes an insertion section 80A and a holding section 80B. The insertion section 80A is a vehicular front side end portion of the insertion stopper hole 80 with respect to the extending direction of the grip base member 30 and the anchor section 78 is inserted through the insertion section 80A. The insertion section 80A has a substantially rectangular shape and a long side dimension thereof is perpendicular to the extending direction of the grip base member 30. The rectangular shape of the insertion section 80A is slightly greater than the shape of the anchor section 78 of the tether clip 72.

The holding section 80B extends from the insertion section 80A in a direction perpendicular to the long dimension of the insertion section 80A. The holding section 80B has a width smaller than that of the anchor section 78 and greater than that of the tether section 76. The tether section 76 (specifically the second extending portion 76B) is held by the holding section 80B. A basal portion of the anchor section 78 is much thicker than the tether section 76. Therefore, the anchor section 78 is stopped by the holding section 80B of the insertion stopper hole 80 surely and the tether clip 72 is less likely to be released from the insertion stopper hole 80.

The anchor section 78 is inserted through the insertion section 80A and guided along the holding section 80B and the tether section 76 is held by the holding section 80B such that the tether clip 72 is attached to the insertion stopper hole 80. Even if a force acts on the tether clip 72 in an axial direction of the tether section 76 due to the side collision, the anchor section 78 is stopped by the holding section 80B of the insertion stopper hole 80 and therefore, the grip cover 32 is less likely to be detached from the grip base member 30. The tether section 76 of the tether clip 72 extends in the longitudinal direction of the grip cover 32 and a force acts on the anchor section 78 toward the holding section 80B in case of the side collision because the fixing section 74 is fixed to the grip cover 32. Therefore, the tether clip 72 is less likely to be detached from the insertion stopper hole 80.

To attach the tether clip in the insertion stopper hole in a related art, the anchor section is inserted through the insertion section and then, the tether clip is necessarily moved along the holding section. Therefore, when the grip cover to which the tether clip is attached is mounted on the grip base member, the tether clip is necessarily first attached in the insertion stopper hole and then, the grip cover is connected to the grip base member by fitting the first mounting member, the second mounting member, and the third mounting member. This lowers mounting workability.

According to the interior cover mount assembly 100 of the present embodiment, the mounting operation of the grip cover 32 including the tether clip 72 on the grip base member 30 is simplified. As illustrated in FIG. 5, the grip base member 30 includes reinforcing ribs 82A, 82B, 82C, 82D on the vehicular interior side surface thereof to increase rigidity thereof. The reinforcing ribs 82A, 82B, 82C, 82D project from the vehicular interior side surface of the grip base member 30 and extend in a direction perpendicular to the longitudinal direction of the grip base member 30, which is in a width direction thereof. A part of the walls 50 of the third mounting member may function as the reinforcing rib.

As illustrated in FIG. 5, the reinforcing ribs 82B are arranged near the insertion stopper hole 80 and cross the holding section 80B of the insertion stopper hole 80. Namely, the reinforcing ribs 82B extend from two side hole edges of the holding section 80B in the width dimension of the grip base member 30, respectively. Each of the reinforcing ribs 82B is a plate member having plate surfaces extending in the width direction of the grip base member 30 and vertically from the vehicular interior side surface of the grip base member 30. As illustrated in FIGS. 5 and 7, when the grip cover 32 is mounted on the grip base member 30, the anchor section 78 overlaps a part of each of the reinforcing ribs 82B on the two ends of the holding section 80B and also overlaps the holding section 80B with respect to the mounting direction 90.

Hereinafter, the mounting operation of mounting the grip cover 32 on the grip base member 30 will be described with reference to FIG. 8. First, the grip cover 32 to which the tether clip 72 is fixed at the fixing section 74 is positioned on the grip base member 30 and the lower board 26 in a mounting position such that the anchor section 78 of the tether clip 72 is contacted with the reinforcing ribs 82B as illustrated with a solid line in FIG. 8. According to the movement of the grip cover 32 in the mounting direction 90, the third stopper 52 of the grip cover 32 is contacted with the wall 50 and the position of the grip cover 32 with respect to the grip base member 30 is determined by the second mounting member (the second stopper holes 44 and the second stoppers 46U, 46L). The third stopper 52 that is contacted with the wall 50 is parallel to a width dimension of the grip cover 32 and has the projection on a vehicular rear side surface thereof. Further, the first guide member 60 receives the second guide member 62 therein and the mounting direction 90 in which the grip cover 32 is mounted on the grip base member 30 is determined.

If the grip cover 32 is further pushed to the grip base member 30, the tether clip 72 is elastically deformed by the reinforcing ribs 82B such that the tether section 76 is elastically deformed around the fixing section 74 as illustrated with a two-dot chain line in FIG. 8. Accordingly, the anchor section 78 is moved toward the insertion section 80A of the insertion stopper hole 80. The tether clip 72 is moved in the mounting direction 90 such that the anchor section 78 and the second extending portion 76B are guided by the reinforcing ribs 82B and inserted in the insertion section 80A. The anchor section 78 and the second extending portion 76B are guided along the plate surfaces of the reinforcing ribs 82B. Namely, in the present embodiment, the reinforcing rib 82B corresponds to the projection of the interior cover mount assembly.

Figure 6:
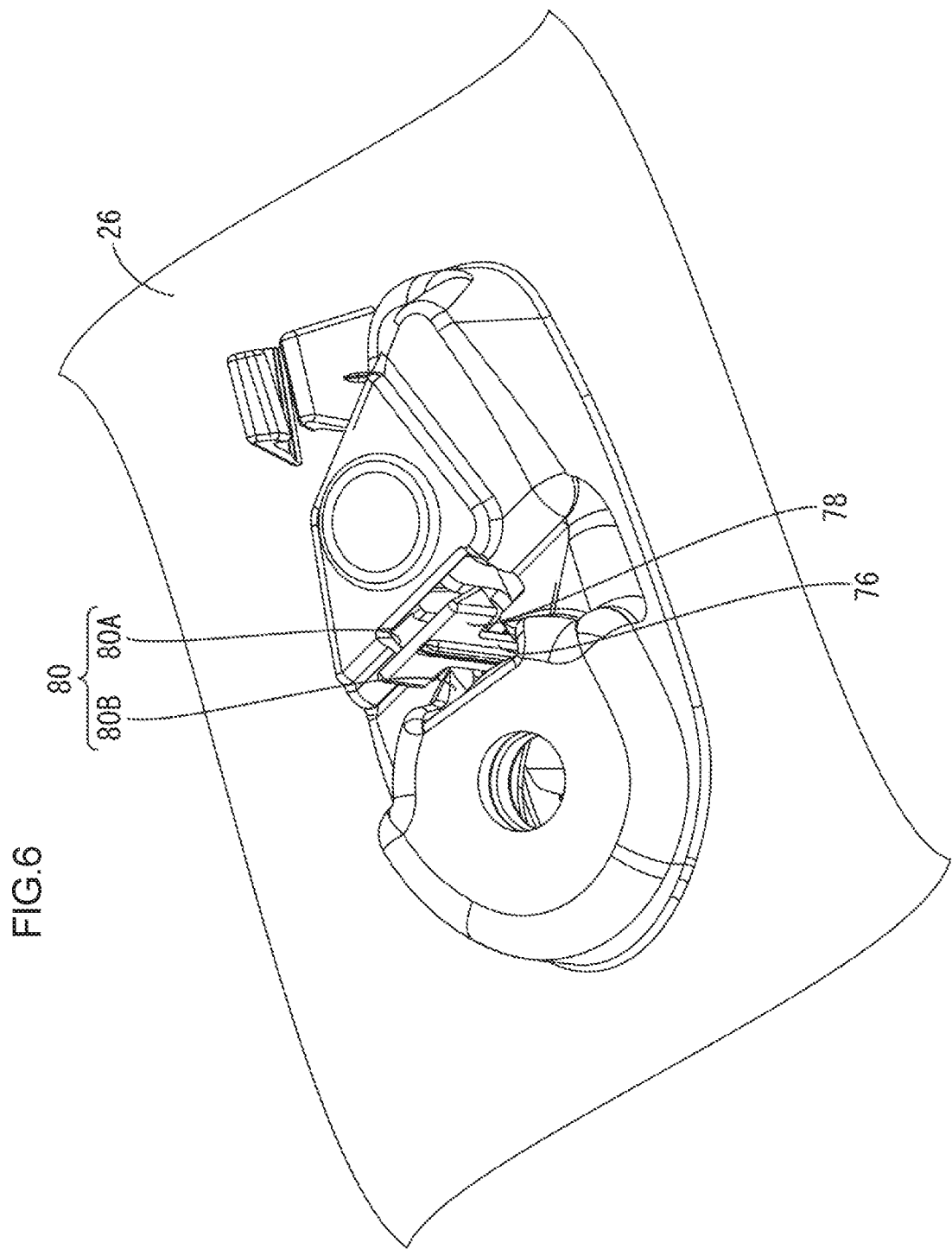
FIG. 6 is a perspective view illustrating the grip cover that is mounted on the grip base member seen from a vehicular exterior side.

If the grip cover 32 is further pushed toward the grip base member 30, the anchor section 78 and the second extending portion 76B are guided by the reinforcing ribs 82B and inserted in the insertion section 80A. When the anchor section 78 passes through the insertion section 80A to a vehicular exterior side surface of the lower board 26 as illustrated in FIGS. 6 and 7, the tether section 76 elastically restores its original shape and the anchor section 78 moves back toward the fixing section 74 and is fit in the holding section 80B. Thus, according to the interior cover mount assembly 100 of this embodiment, the mounting of the grip cover 32 on the grip base member 30 with the tether clip 72 is completed only by pushing the grip cover 32 to the grip base member 30 in the mounting direction.

As illustrated in FIGS. 5 and 7, when the grip cover 32 is mounted on the grip base member 30, the tether clip 72 is fit in the holding section 80B. In such a state, the tether section 76 is arranged in the holding section 80B and the anchor section 78 overlaps the holding section 80B and the reinforcing ribs 82B on the two end sides of the holding section 80B with respect to the mounting direction 90. According to such a configuration, the tether clip 72 is less likely to be detached from the grip base member 30 in both of the longitudinal direction of the grip cover 32 and the mounting direction 90.

In the interior cover mount assembly 100 having the above configuration, the grip cover 32 is mounted on the grip base member 30 with the tether clip 72 and accordingly, the grip cover 32 is less likely to be detached from the grip base member 30 while simplifying the mounting operation of the grip cover 32 on the grip base member 30. In the present embodiment, the reinforcing rib of the grip base member 30 functions as the projection that is contacted with the tether clip 72 and guides the movement of the tether clip 72. According to such a configuration, a small area within the grip base member 30 can be effectively used.

The interior cover mount assembly 100 of the present embodiment is not necessarily limited to the mounting of the grip cover on the base member but may be used for another cover member included in a door trim and may be used for a cover attached to a vehicular interior component other than a side door. The insertion stopper hole 80 in which the tether clip is inserted has a substantially T-shape. However, the shape of the insertion stopper hole 80 is not particularly limited. The projection (82B) may have various shapes according to the shape of the insertion stopper hole.

The invention claimed is:

1. An interior cover mount assembly comprising:
   a base member; and
   an interior cover that is attached to the base member from a vehicular interior side in a mounting direction, the interior cover including a clip with which the interior cover is fixed to the base member, the clip including
      an arm section extending from the interior cover toward the base member, and
      a head section that is included continuously from a distal end portion of the arm section and has a width greater than a width of the arm section,
   the base member having an insertion stopper hole through which the head section is inserted and a projection projecting from a vehicular interior side surface of the base member toward the interior cover,
      the insertion stopper hole including an insertion section through which the head section is inserted and a holding section extending from the insertion section and having a width smaller than a width of the head section and greater than a width of the arm section and in which the arm section is arranged, and
      the projection being disposed near the holding section, wherein
   when the interior cover is mounted on the base member, the clip is fit in the insertion stopper hole such that the head section overlaps the holding section and the projection in the mounting direction,
   the clip is elastically deformed toward the insertion section by contact with the projection according to movement of the interior cover toward the base member in the mounting direction in a mounting operation of the interior cover to the base member, and according to further movement of the interior cover toward the base member in the mounting direction, the head section is inserted through the insertion section and the clip elastically restores its original shape and the arm section is fit in the holding section such that the clip is held in the insertion stopper hole.

2. The interior cover mount assembly according to claim 1, wherein the projection is a reinforcing rib that extends from the holding section.

3. The interior cover mount assembly according to claim 1, wherein the interior cover is an elongated member and includes the clip in one end section thereof with respect to an elongated direction, and the insertion stopper hole has a shape such that the holding section is continuous from the insertion section and extends from the insertion section toward another end section of the interior cover.

4. The interior cover mount assembly according to claim 3, wherein the arm section projects in a longitudinal direction from the one end section of the interior cover toward a vehicular exterior side.

5. The interior cover mount assembly according to claim 1, wherein one of the interior cover and the base member includes projections projecting therefrom toward another one of the interior cover and the base member, the other one of the interior cover and the base member includes recesses corresponding to the respective projections and in which the projections are fit, respectively, and the projections and the recesses are fit to each other to define the mounting direction.

6. The interior cover mount assembly according to claim 1, wherein the head section is thicker than the arm section.

7. The interior cover mount assembly according to claim 1, wherein the base member is an elongated member extending in a longitudinal direction and has a width in a width direction perpendicular to the longitudinal direction, the projection includes at least two projections, and the at least two projections are plate members extending from two side hole edges of the holding section, respectively, in the width direction of the base member.

8. The interior cover mount assembly according to claim 7, wherein the head section and the arm section are guided along plate surfaces of the at least two projections toward the insertion section.

9. The interior cover mount assembly according to claim 1, wherein the interior cover further includes a stopper projecting from a vehicular exterior side surface of the interior cover and having a projection at a distal end thereof, the base member further includes a wall projecting from the vehicular interior side surface of the base member and having a hole, and the projection of the stopper fits in the hole of the wall when the interior cover is mounted on the base member.

10. The interior cover mount assembly according to claim 9, wherein the clip further includes a fixing section that is fixed to the interior cover, the interior cover further includes a clip fixing section that is fixed to the fixing section and the stopper extends from the clip fixing section.

11. The interior cover mount assembly according to claim 1, wherein the interior cover further includes a first guide member projecting from a vehicular exterior side surface thereof, the base member further includes a second guide member projecting from the vehicular interior side surface thereof, and the first guide member and the second guide member are fit together when the interior cover is mounted on the base member.

* * * * *